United States Patent [19]

Hanses

[11] Patent Number: 4,688,823
[45] Date of Patent: Aug. 25, 1987

[54] AXLE WEIGHT FOR MOTOR VEHICLES

[76] Inventor: Harold J. Hanses, Box 14, Swalwell, Alberta, Canada

[21] Appl. No.: 832,549

[22] Filed: Feb. 24, 1986

[51] Int. Cl.⁴ ............................................. B60B 39/00
[52] U.S. Cl. ................................... 280/759; 301/41 R
[58] Field of Search ............. 280/755, 757, 759, 762; 301/41 R, 41 W; 16/253; 180/900, 905; 269/130, 131, 170

[56] References Cited

U.S. PATENT DOCUMENTS

| | | | |
|---|---|---|---|
| 455,136 | 6/1891 | Vanderman | 269/130 |
| 877,105 | 1/1908 | Moore | 269/131 |
| 1,687,296 | 10/1928 | Johnson | 280/759 |
| 2,621,060 | 12/1952 | Onarheim | 280/757 |
| 4,190,281 | 2/1980 | Chandler | 280/759 |
| 4,482,169 | 11/1984 | Yim | 280/759 |

FOREIGN PATENT DOCUMENTS 530365 12/1940 United Kingdom ............... 269/131

Primary Examiner—John A. Pekar
Assistant Examiner—Eric P. Culbreth
Attorney, Agent, or Firm—Harold H. Dutton, Jr.

[57] ABSTRACT

A traction device for a motor vehicle which may include a heavy weight for placing in the trunk of an automobile or in the box of a truck. A better form of weight-type traction device includes a metal body for mounting on a motor vehicle axle and a strap, the ends of which are connected to the body, to securely mount the body on the axle.

1 Claim, 4 Drawing Figures

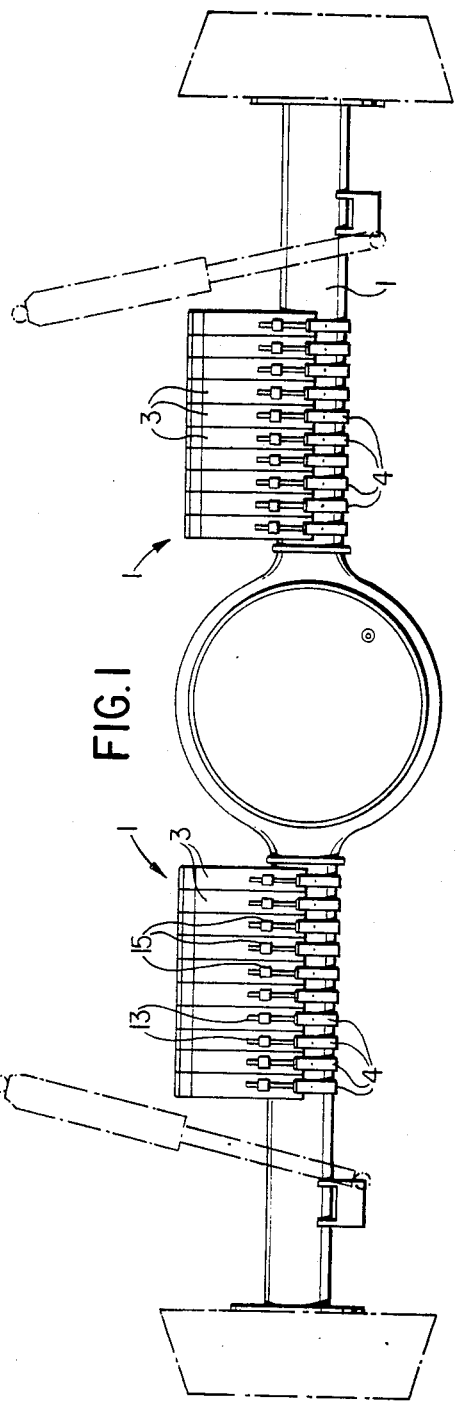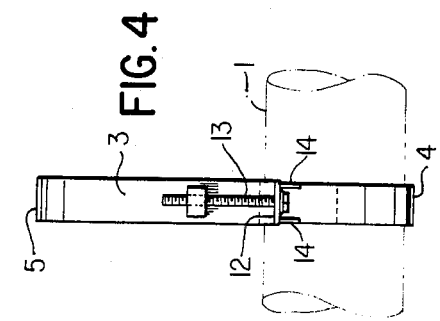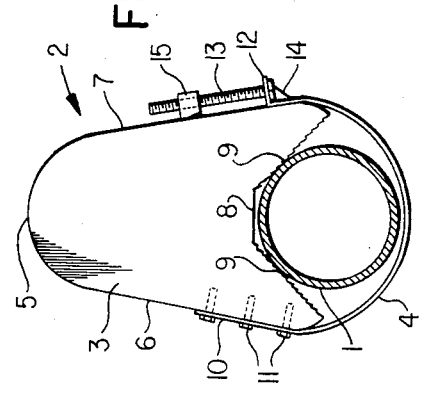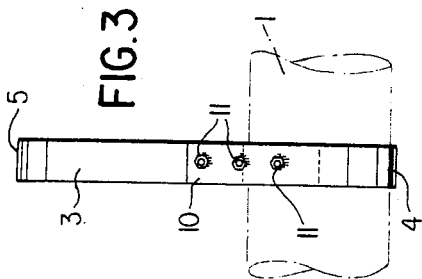

AXLE WEIGHT FOR MOTOR VEHICLES

BACKGROUND OF THE INVENTION

This invention relates to a traction device and in particular to a traction device for use on a motor vehicle axle.

There are many forms of traction devices of varying complexity. One simple form of traction device involves the use of some form of weights. Examples of such traction devices are found in U.S. Pat. No. 4,190,281 which issued to Steven G. Chandler on Feb. 28, 1980 and U.S. Pat. No. 4,482,169 which issued to George Yim on Nov. 13, 1984. The patented devices include a ballast for mounting in the box of a pick-up truck and a rectangular rack for placing on the bed of a truck between the wheel wells. While such devices may perform in the desired manner, they occupy normally usable storage space in the vehicle. In general the devices act in the same manner as bags of sand in an automobile trunk. Accordingly there exists a need for a simple ballast or weight-type traction device which does not occupy usable space in a vehicle.

An object of the present invention is to meet the above mentioned need by providing a simple traction device for use on the axle housing of a motor vehicle.

Another object of the invention is to provide a traction device which can be used with similar devices to increase traction and which can be easily mounted on and removed from a vehicle axle housing.

BRIEF SUMMARY OF THE INVENTION

Accordingly the present invention relates to a traction device for use on a motor vehicle axle housing, comprising weight means for mounting on the axle and means for connecting the weight means to the axle housing.

BRIEF DESCRIPTION OF THE DRAWINGS

The invention will now be described in greater detail with reference to the accompanying drawing which illustrates a preferred embodiment of the invention and wherein:

FIG. 1 is a schematic, rear elevation view of an axle housing carrying several traction devices in accordance with the present invention;

FIG. 2 is a side view of the traction device of FIG. 1; and

FIGS. 3 and 4 are end elevations of the traction device of FIGS. 1 and 2.

DESCRIPTION OF THE PREFERRED EMBODIMENT(S)

With reference to the drawings, the traction device of the present invention is intended for use on a vehicle axle housing 1. In this case, the vehicle axle housing is obvious the rear axle of a truck. Because of the accessibility of truck axles the device is best suited for use on such axles. However, the traction device can be used on virtually any vehicle axle or axle housing, it is merely necessary to change the size of the device to suit the axle housing.

The traction device which is generally indicated at 2 is defined by a solid body or weight 3 and a strap 4, for connecting the weight to the axle housing 1. The weight 3 is defined by a single piece of metal and includes a semi-circular upper end 5, downwardly and outwardly flaring front and rear ends 6 and 7, respectively, and a generally inverted U-shaped bottom end 8. Saw-toothed projections 9 are provided on the sides of the groove in the bottom end 8 for gripping the top of the axle housing 1.

One end 10 of the strap 4 is fixedly connected to the front end 6 of the weight 3 by bolts 11. Of course other forms of connectors can be used to connect the end 10 of the strap 4 to the weight 3. The other end of the strap 4 is bent outwardly to define a flange 12 for receiving a bolt 13. The flange is maintained at a right angle to such other end of he strap 4 by a pair of gussets 14 (only one shown in FIG. 2).

In use the weight 3 is placed on an axle housing 1 and the strap 4 is wrapped around the bottom of the axle. A bolt 13 is inserted through the flange 12 and screwed into an internally threaded lug 15 on the rear end 7 of the weight 3 to securely attach the traction device to the axle housing.

Obviously the number of traction devices used on any given axle will depend on the mass of the weight 3, the strength of the vehicle axle housing, shock absorbers and springs and the amount of traction required. Lightweight traction devices can be used on small motor vehicles and larger, heavier devices on truck axles.

Thus there has been described a relatively simple traction device which is easy to mount on the axle housing of a motor vehicle.

What I claim:

1. An axle weight for improving the traction of motor vehicles comprising a weight member having a generally inverted U-shaped notch formed in the lowe extremity thereof, the sides of said notch having serrations formed therein for engaging and gripping the upper portion of an axle housing, strap means having one end secured to one side of said weight member and extending in a generally U-shaped manner across said notch to the other side of said weight member, a lug on said other side of said weight member, and a threaded fastener connecting the other end of said strap means to said lug and thereby clamping said weight member to the upper side of said axle housing.

* * * * *